United States Patent [19]

Zilahi-Szabo

[11] 4,226,139

[45] Oct. 7, 1980

[54] VISCOUS SHEAR DAMPERS

[75] Inventor: Imre Zilahi-Szabo, Győr, Hungary

[73] Assignee: Magyar Vagon- es Gepgyar, Győr, Hungary

[21] Appl. No.: 858,907

[22] Filed: Dec. 13, 1977

[30] Foreign Application Priority Data

Dec. 13, 1976 [HU] Hungary .................. MA 2839

[51] Int. Cl.³ ............................................. F16F 15/10
[52] U.S. Cl. ............................................. 74/574
[58] Field of Search ................................. 74/574, 573

[56] References Cited

U.S. PATENT DOCUMENTS

| 2,824,467 | 2/1958 | O'Connor | 74/574 |
| 3,234,817 | 2/1966 | Williamson | 74/574 |
| 3,512,612 | 5/1970 | Bragg et al. | 74/574 X |
| 3,552,230 | 1/1971 | McLean | 74/574 |
| 3,555,926 | 1/1971 | Moorhouse et al. | 74/574 |
| 3,641,839 | 2/1972 | Greeley | 74/574 |
| 4,044,627 | 8/1977 | Zander | 74/574 |

Primary Examiner—Samuel Scott
Assistant Examiner—Wesley S. Ratliff, Jr.
Attorney, Agent, or Firm—Young & Thompson

[57] ABSTRACT

In a viscous shear damper the seismic mass is chamfered at all its corners. Thus, the clearances between the seismic mass and its casing are gaps with oppositely widening out sections separated by middle sections of smallest widths.

4 Claims, 4 Drawing Figures

VISCOUS SHEAR DAMPERS

BACKGROUND OF THE INVENTION

This invention relates to viscous shear dampers.

Dampers of this type consist of an annular seismic mass or inner member enclosed in a ring-shaped casing. The seismic mass is separated from the casing by peripheral and lateral gaps or clearances which are filled with a viscous fluid. The casing is fixed e.g. on the free end of the crankshaft of an internal combustion engine the vibrations of which have to be damped. Upon rotation of the engine shaft and, thus, of the casing, the seismic mass is acted upon only by the viscous torque transmitted by the fluid filling. The significance of such "untuned" dampers resides in that they lower the value of the natural frequency of the engine system while reducing the vibration amplitudes. Viscous shear dampers are discussed in details e.g. in "A Handbook on Torsional Vibration" compiled by E. J. Nestorides, Cambridge at the University Press, 1958, hereby incorporated by reference.

Ordinarily, the viscous fluid is a silicone fluid or oil the lubrication effect of which is re-relatively small. Therefore, it is a tendency in the art to restrict a direct contact of the casing and the inner member as far as possible. To avoid rubbing and pitting, phosphor-bronze rubbing pads have been fitted on the outer peripheral surface of the seismic mass. A simpler solution consists in providing the seismic mass with a central location in the form of a non-ferrous (e.g. phosphor bronze) bush, fitted over the inner wall of the casing. In view of the possibility of axial vibrations such bush may also be designed with thrust surfaces for end location. Another known expedient is to use a bush pressed into the seismic mass and slightly clear of the casing. Further alternative arrangements include the provision of lateral locating rings of bronze inserted on the seismic mass. It is generally considered that a fairly massive section of metal is needed immediately inside the periphery of the casing to give good support to the bearing in cases where the seismic mass runs on its inner bore. It is usual for the bronze locating bush to be a tight press fit onto the inner surface of the casing in order that expansion due to heat may not tend to free the bush.

The above described arrangements permit to obtain fully satisfactory results and are extensively used. Moreover, they have proved satisfactory in operation over long periods. Nevertheless, correct fitting of pads has been found an expensive and laborious procedure. Broadly, the same applies to bushes and lateral locating rings.

SUMMARY OF THE INVENTION

The main object of the present invention is to further improve the art of viscous shear dampers by eliminating the need of employing correctly fitted pads, locating rings, bushes and the like, and that in conjunction with undiminished damping effect and lifetime. It has been recognized that the seismic mass, if permitted to move freely within the limits of usual clearances, has a tendency to assume and maintain a freely floating position which is symmetrical with respect to the casing. Free movability of the seismic mass ensures that it will counteract radial and axial displacements as well as tilting movements and, thus, will retain or restore its floating position whenever it is removed therefrom for reasons whatever. Such free movability of the seismic mass is ensured by peripheral and lateral gaps which have, in compliance with the basic concept of the invention, oppositely widening out sections. Thus, the gaps have a narrowest part on both sides of which their widths continuously increase until the respective gaps intersect with gaps at both extremities thereof. Such gaps will permit tilting movements of the seismic mass and will exercise a stabilizing influence on its floating position.

These and further details will be described hereinafter by taking reference to the accompanying drawings which show, by way of example, an embodiment of the viscous shear damper according to the invention.

DESCRIPTION OF THE PREFERRED EMBODIMENT

Figure 1:
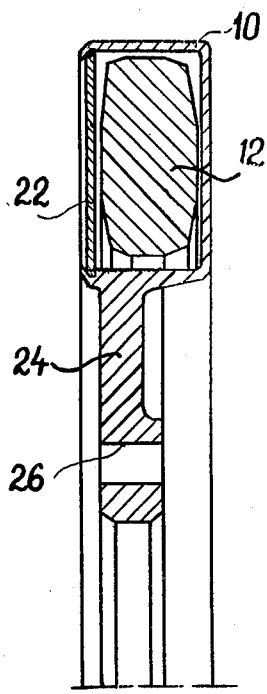
FIG. 1 represents a radial sectional view of the exemplified damper.

In the drawings reference characters 10 and 12 designate a casing and a seismic mass or inner member, respectively. As shown particularly in FIG. 2, casing 10 and seismic mass 12 enclose an outer peripheral gap 14, an inner peripheral gap 16, and a pair of lateral gaps 18 and 20 which are filled with a viscous fluid such as silicone oil (not shown) in a conventional manner.

The lefthand side of casing 10 as regards FIG. 1 is closed by a back plate 22 which, in the instant case, is fixed by means of machine rolling and peening the edges 10a and 10b of the casing 10 over the cover plate 22 in a manner known per se after the gaps 14, 16, 18, 20 have been filled with the viscous fluid. The edges 10a and 10b will be rolled over a soft sealing material (indicated at 23) in a likewise conventional manner.

It will be seen that the minimum width a of the inner peripheral gap 16 is greater than the minimum width b of the outer peripheral gap 14, that is $a > b$ Therefore, with radial displacements of the seismic mass 12 the latter will contact the casing 10 at and be supported on its outer periphery where lubrication is more abundant.

Reverting to FIG. 1, casing 10 is supported by an annular web portion 24 of the shear damper provided with circumferentially distributed bores one of which is designated by reference character 26. The bores 26 serve for fixing the shear damper to a rotating member torsional vibrations of which should be damped as in the case of a crank shaft of an internal combustion engine.

Figure 2:
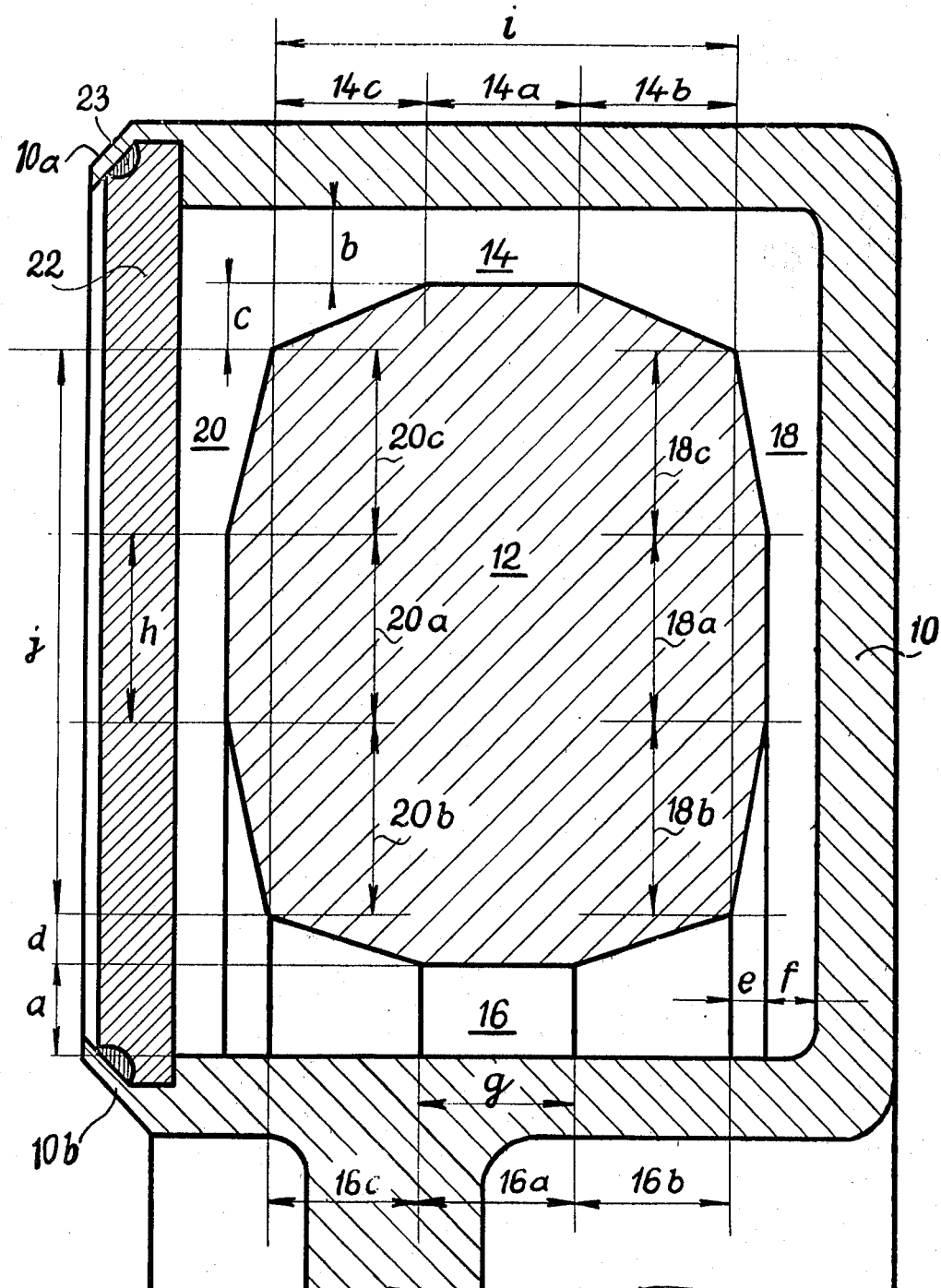
FIG. 2 shows a detail of FIG. 1 at a substantially enlarged scale.

In compliance with the invention, the gaps 14, 16, 18, 20 have each oppositely widening out sections (FIG. 2). In particular, outer peripheral gap 14 comprises a middle section 14a and two lateral sections 14b and 14c which gradually widen out as they approach the lateral gaps 18 and 20, respectively.

In a similar manner, inner peripheral gap 16 has a middle section 16a of constant width with two lateral sections 16b and 16c of widths gradually increasing towards the lateral gaps 18 and 20, respectively.

Corresponding parts of the lateral gaps 18 and 20 are designated by reference numerals 18a, 18b, 18c and 20a, 20b, 20c, respectively.

With the represented embodiment, the required configuration of the gaps 14, 16, 18 and 20 is due to a special cross-sectional shape of the seismic mass 12 while the casing 10 retains its usual form. Such arrangement obviously permits to employ simple machining operations and even the use of conventional casings.

The substantially quadrangular cross-sectional area of the seismic mass 12 is distinguished by being chamfered at all its four corners so that the annular body of the seismic mass will show altogether eight conical surfaces which define cones the apices of which lie on the axes of the damper. Thus, in the instant case, the seismic mass 12 has substantially convex peripheral and lateral surfaces. Preferably, each convex surface will have an elevated middle portion between a pair of outwardly declining lateral portions. For obvious reasons, contours in axial sectional views will be straight lines.

With usual clearances, it has been found that the maximum size of the gaps 14, 16, 18 and 20 preferably will not be greater than twice their minimum sizes.

In other words, the difference c between the maximum size of the outer peripheral gap 14 and its minimum size b will not be greater than the latter which means that $$c \leq b$$

In a similar manner, the difference d between the maximum size of the inner peripheral gap 16 and its minimum size a will not be greater than the latter which means that $$d \leq a$$

The same applies to the lateral gaps 18 and 20: the difference e between their maximum and minimum sizes will not be greater than the latter which means that $$e \leq f$$

where f designates the minimum size of the lateral gaps 18 and 20.

Furthermore, it has been found advantageous if the minimum size b of the outer peripheral gap 14 is somewhat greater than the minimum size f of the lateral gaps 18 and 20. The ratio will preferably be greater than 1.1 which means that $$b/f > 1.1$$

Though the lengths g of the middle sections 14a and 16a of the peripheral gaps 14 and 16, and the lengths h of the middle sections 18a and 20a of the lateral gaps 18 and 20, respectively, are not particularly critical, preferably they will occupy broadly one third of the total length of the respective gaps. If such total lengths are designated by i for the peripheral gaps 14 and 16, and by j for the lateral gaps 18 and 20, the above said relations mean that $$g \sim \tfrac{1}{3} i$$

and $$h \sim \tfrac{1}{3} j$$

where the mathematical sign "∼" means "substantially" or "broadly".

Figure 4:
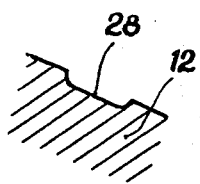
FIG. 4 illustrates a sectional view of a detail taken along line IV—IV of FIG. 3.
Figure 3:
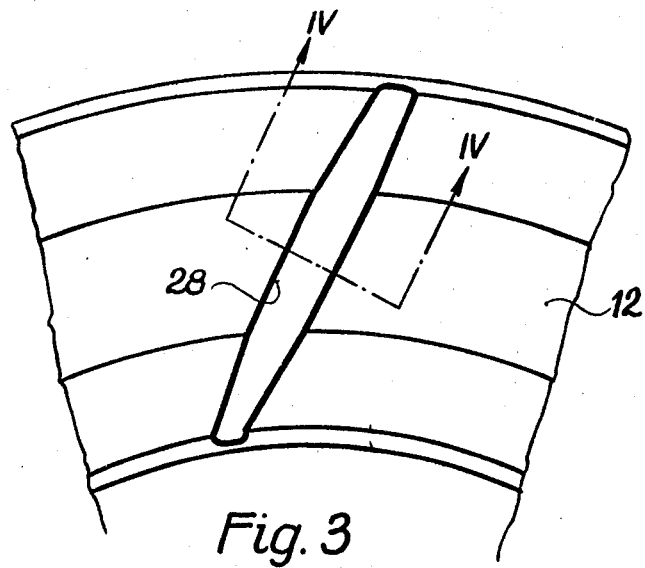
FIG. 3 is an enlarged side elevational view of FIG. 1.

As shown in FIGS. 3 and 4, the lateral surfaces of the seismic mass 12 are provided with grooves 28 which serve for storing viscous fluid and conducting it to the relatively narrow lateral gaps 18 and 20.

In operation, under normal conditions the seismic mass 12 occupies its symmetrical position with respect to the casing 10 as shown in FIGS. 1 and 2 where it is floating in the not represented viscous fluid which fills the gaps 14, 16, 18 and 20.

Torsional vibrations will be damped in the usual manner.

Whenever the seismic mass 12 is removed from its symmetrical position, the viscous fluid is forced to flow in such direction that displacements of the seismic mass 12 are counter-acted.

Thus, with radial and axial displacements of the seismic mass 12 the viscous fluid is squeezed out from respective gap sections 14a, 16a, 18a and 20a, as the case may be. This means that a previous state of torque equilibrium is disturbed and a torque appears by which the seismic mass 12 is angularly displaced until it again assumes its original and symmetric position where torques acting on it are in equilibrium.

Practically, the same applies to tilting movements of the seismic mass 12. Such movements are rendered possible within wide limits by the chamferings of the seismic mass 12: in a tilted position thereof e.g. in the counter-clockwise direction as regards the drawing the declining portion of the convex surface which corresponds to the lateral gap section 20c will gradually assume a position wherein it is parallel to the inner wall of the casing 10 thereby confining with the latter a gap section the size of which is equal to the minimum size f of such gap. At the same time, the elevated portion and the other declining portion of the same convex surface corresponding to the middle section 20a and the lateral section 20b, respectively, of the gap 20 recede from the inner wall of the casing 10. The displacement of the other side of the seismic mass 12 facing the gap 18 takes place in an opposite direction.

The same applies to the outer and inner peripheral surfaces.

All that means that the state of torque equilibrium is considerably disturbed and the seismic mass 12 will be subject to forces which act on it from all sides and cause it to resume its neutral position. Thus, torque equilibrium will vigorously be restored together with the symmetric floating position of the seismic mass 12.

Meanwhile the grooves 28 enhance the flow of the viscous fluid under the action of centrifugal forces into the outer peripheral gap 14 where relatively more fluid is needed than in the shorter inner peripheral gap 16, and into minimum size gap portions such as sections 14a, 16a, 18a and 20a where the presence of lubricating viscous fluid is of paramount importance.

Hereinbefore the invention has been described on basis of an embodiment in which the casing 10 was of the conventional type whereas the seismic mass 12 had a special cross-sectional shape. Moreover, experimental size relationships have been described which proved to be advantageous as regards operation and lifetime of the damper according to the invention. However, it is possible to deviate from the shapes and size relationships of the illustrated embodiment. For instance, it is possible to form the casing 10 with outwardly declining inner walls rather than to chamfer the seismic mass which, then, may be of the usual rectangular form. Both expedients might be employed simultaneously.

A subdivision of the surfaces and gaps, respectively, in three practically equally long sections is preferable yet not compulsory. A deviation in the range of about 5 to 10% would not be of any consequence as regards operation though damping capacity and lifetime may suffer some deterioration. Also more care has to be taken of the symmetry of the cross-sectional shape of the seismic mass.

The lower limit of 1.1 for the ratio of the gap widths is likewise a preferable value obtained by experiments. However, smaller ratios could also be employed if suitable fineness of machining is ensured.

What we claimed is:

1. A viscous shear damper including a ring-shaped casing and a seismic mass in the form of an annular body arranged for floating in said casing, said casing and said seismic mass defining between them an outer peripheral gap, an inner peripheral gap, and a pair of lateral gasp for being filled with a viscous fluid, all said gaps having each oppositely widening out sections on both sides of a middle portion, the widths of the gaps at their widest points being not greater than twice their widths at their narrowest points, and the middle portion of each gap being not longer than the widening out portions contiguous therewith, the annular body having convex peripheral and lateral surfaces comprising each an elevated middle portion between a pair of outwardly declining lateral portions, the declining lateral portions of the convex surfaces lying on cones having apices, the apices of the cones lying on the axis of the damper while the middle portions are cylindrical contiguous to the peripheral gaps and annular contiguous to the lateral gaps so that the annular body has altogether eight conical surfaces.

2. A viscous shear damper as claimed in claim 1, the minimum size a of the inner peripheral gap (16) being greater than the minimum size b of the outer peripheral gap (14) which means that $$a > b$$

3. A viscous shear damper as claimed in claim 2, the ratio between the minimum size b of the outer peripheral gap (14) and the minimum size f of the lateral gaps (18, 20) being greater than 1.1 which means that $$b/f > 1.1$$

4. A viscous shear damper as claimed in claim 1, and fluid storing and conducting grooves (28) in lateral surfaces of the seismic mass (12), said grooves extending from the inner peripheral gap (16) to the outer peripheral gap (14).

* * * * *